May 12, 1931.  L. W. SPRINGSTEEN  1,805,023
FLUID OPERATED DRIVING MEANS
Filed Jan. 7, 1927   2 Sheets-Sheet 1
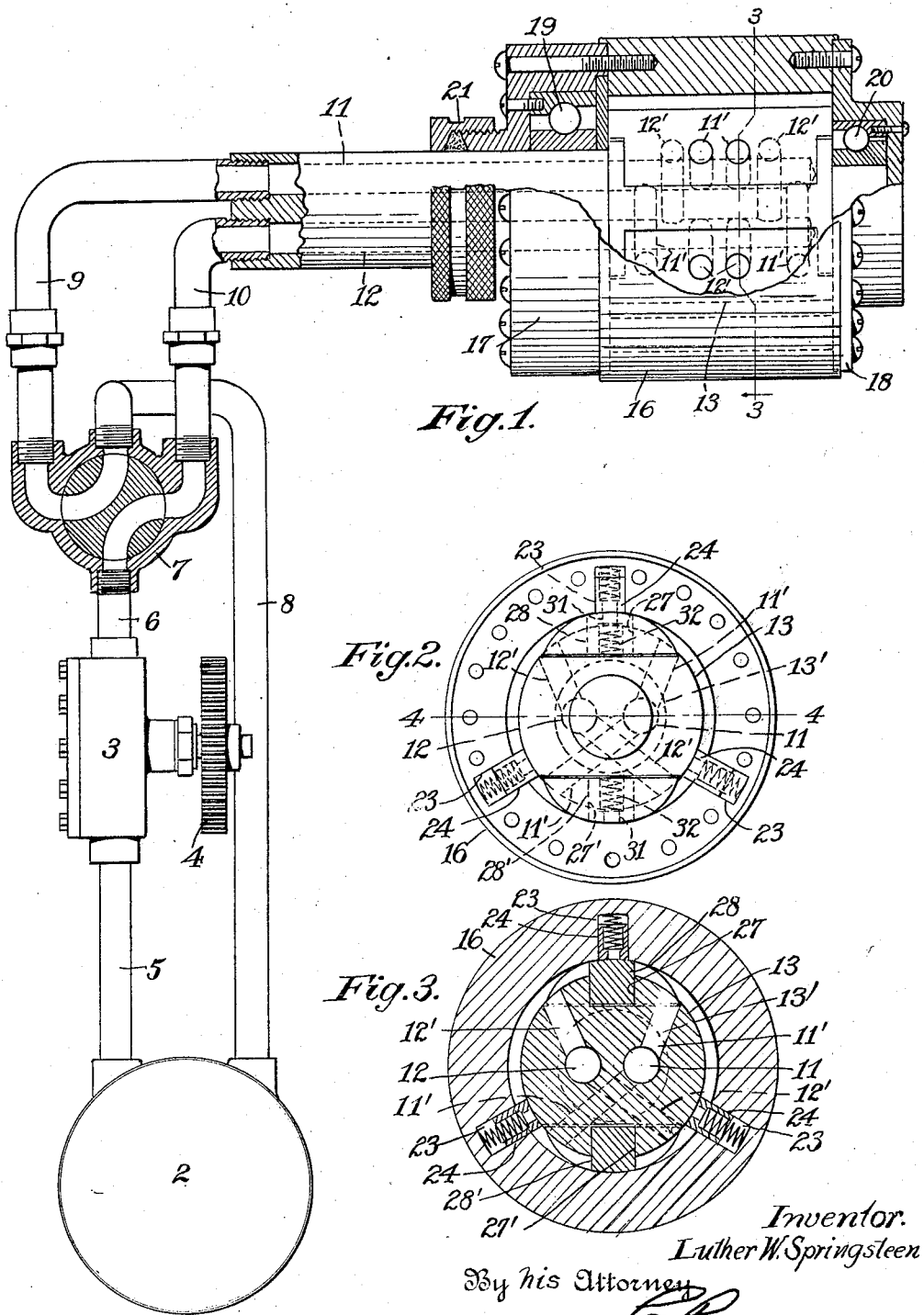
Inventor.
Luther W. Springsteen
By his Attorney

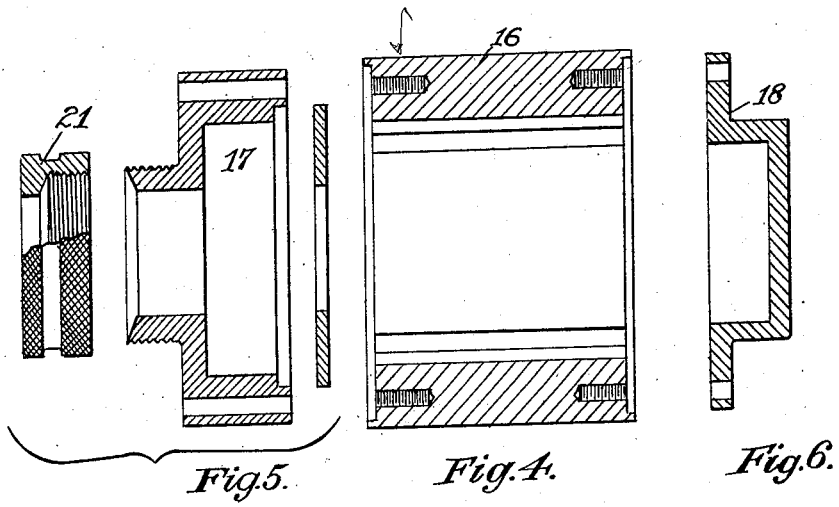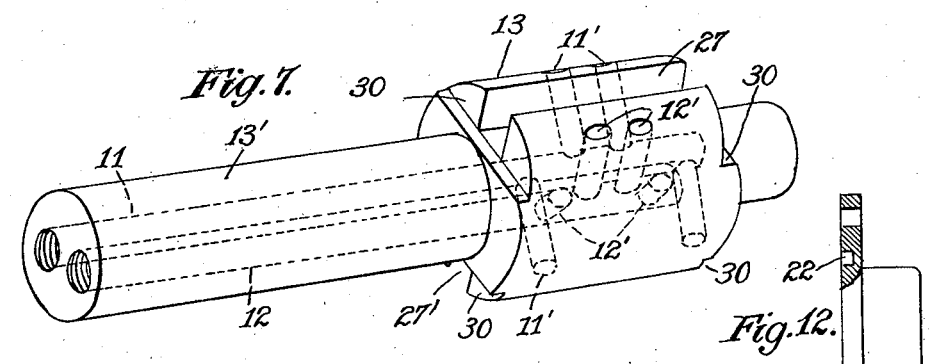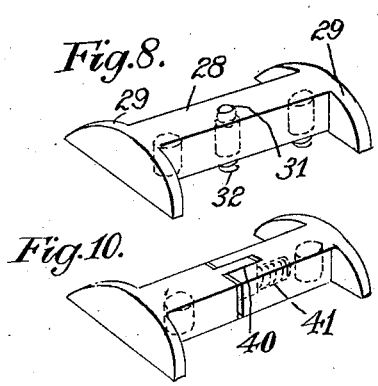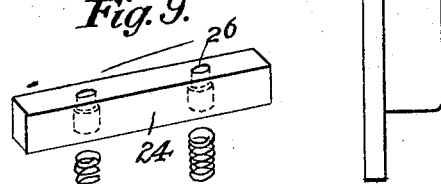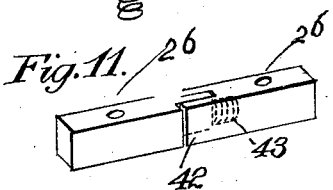

Patented May 12, 1931

1,805,023

UNITED STATES PATENT OFFICE

LUTHER W. SPRINGSTEEN, OF AFTON, NEW YORK, ASSIGNOR TO NATIONAL HYDRODRIV COMPANY, OF BINGHAMTON, NEW YORK, A COMPANY OF NEW YORK

FLUID OPERATED DRIVING MEANS

Application filed January 7, 1927. Serial No. 159,616.

This invention relates to rotary engines of the hydraulic type, the object of the invention being to provide an improved fluid—, as for instance oil-operated engine or driving means which may be used for various purposes and which is simple in construction, efficient in operation and comparatively inexpensive to manufacture, and which, without material change, may be applied for instance to the hub of a motor vehicle wheel and driven by the motor of the vehicle and controlled from the seat thereof, whereby the usual gear transmission and differential mechanism and the necessary accessories thereto may be eliminated, the present invention being an improvement upon that shown and described in my contemporaneously pending application, Serial Number 155,217, filed December 16, 1926.

A further object of the invention is the provision of an improved driving means so constructed that it may be of comparatively small size and yet the power and efficiency thereof materially increased.

A further object of the invention is the provision of an improved engine or driving means which, by means of suitable controlling mechanism as a valve, may be driven in either direction, as clockwise or anticlockwise, at the same or at varying speeds and in which a tight frictional contact will always be maintained between the rotating and stationary parts and the wear of the several parts automatically taken up and in which also the pressure back of the moving parts, which would prevent the efficient operation of the engine, is relieved.

In the drawings accompanying and forming a part of this specification, Fig. 1 is a plan view partly in section of this improved rotary engine or driving means and illustrating generally a fluid or oil tank and a pump operated from some suitable source of power, as a motor; Fig. 2 is an end view of this improved driving means with the cap removed, the fluid or oil passages being shown in dotted lines; Fig. 3 is a cross-sectional view taken on line 3—3 of Fig. 1; Fig. 4 is a sectional view taken on line 4—4 of the casing shown in Fig. 2; Fig. 5 is a detail sectional view of the means for closing one end of the casing; Fig. 6 is a detail sectional view of the cap at the opposite end of the casing; Fig. 7 is a perspective view of the shaft member, the fluid or oil passages being illustrated in dotted lines; Fig. 8 is a perspective view of one form of wear-take-up member or shoe; Fig. 10 is a perspective view of a modified form of said shoe; Fig. 9 is a perspective view of one of the propellers; Fig. 11 is a perspective view of a modified form of propeller; and Fig. 12 illustrates one of the clamping plates which may be used to maintain the casing fluid-tight.

Similar characters of reference indicate corresponding parts in the several figures of the drawings.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the present instance the construction is such that the engine may be of very much smaller size than that shown in my co-pending application and yet have nearly double the power thereof.

In the construction shown the engine is suitably connected with a fluid or oil tank designated generally as 2, having a pipe connection with a suitable pump designated generally as 3 operated from some suitable source of power by means of a gear 4, or in any other suitable manner. If this driving means is applied to a motor vehicle to take the place of the transmission and differential gearings and their accessories, this pump will be suitably connected with the motor of the vehicle whereby it will be driven thereby and controlled through the usual means for controlling the motor. As any suitable tank and pump mechanism may be used, it is not necessary herein to particularize as to the construction thereof.

The tank is connected with the pump by a supply pipe 5 and from this pump a supply pipe 6 leads to a suitable two-way valve 7, which in turn is connected by a suitable return pipe 8 with the tank. The two-way valve will of course have a suitable by-pass (not shown) so that the fluid in the driving means or engine will be exhausted or drained when the valve is so operated as to cut off the supply of fluid from the pump to the driving means, thereby to stop the engine. This valve may be operated in any suitable way.

The two-way valve is connected by a pair of pipes 9 and 10 with passages 11 and 12 leading through the shaft 13'. These passages 11 and 12 communicate with sets of passages in the concentric cylindrically formed enlarged portion 13 of the shaft 13' and this enlarged portion is rigidly secured to or formed as a part of the shaft 13' and together with such shaft forms the stationary member around which the casing rotates in the form of driving means shown herein, although the reversal of this construction may be obtained by supplying the oil through the casing instead of through the shaft, which would, of course, necessitate a different connection between the pipes 9 and 10 and the shaft 13'. In the present instance this part of the engine or driving means will be designated as the shaft member or stationary member.

The passage 11 in the shaft 13' communicates with two sets of passages 11' in the enlarged portion of the shaft, one pair of which opens at one side of the wear-take-up member or shoe and the other pair opens at the opposite side of this shoe, while the passage 12 communicates with similar sets of passages 12' opening at the opposite sides of the companion shoe.

This improved driving means in its preferred form comprises a rotary casing 16 of cylinder formation and suitable means for closing the ends of the cylinder, this means being shown in the present instance as a pair of caps or clamping plates 17 and 18 bolted to the cylinder of the casing to form a fluid tight chamber. These clamping plates are provided with suitable bearings in the form of ball bearings 19 and 20 for supporting the casing for rotary movement upon the shaft member, and a suitable stuffing box or packing ring 21 is provided between one end of the cap 17 and the shaft 13' to insure a fluid-tight connection. Any suitable means may be used for insuring a fluid-tight connection at the ends of the casing, for instance clamping plates with grooves or slots for the reception of suitable packing may be used to keep the fluid from passing from the casing. Such a form of clamping plate is shown in Fig. 12 in which a suitable annular groove 22 is provided for the reception of suitable packing.

Located at intervals around the interior of the casing is a plurality of recesses or slots 23, carrying shiftable blocks or propellers 24 maintained in projected position by suitable springs 25. In the present instance the casing is made of considerable length and the propellers are of the same length as the casing. Each of the propellers is provided with openings 26 extending therethrough, which serve to relieve the pressure of the fluid or oil when it percolates or passes to the rear of the propellers. Without these openings or their equivalent, the backing up of the oil in the rear of the propellers would maintain them in their projected positions and interfere with the proper operation of the engine. In fact, the pressure at times would be so great as entirely to stop the rotation of the casing.

The enlarged portion of the shaft member hereinbefore described is circular and concentric with the axis of the shaft, so that the periphery thereof is at the same distance all around from the axis of the shaft. This shaft member is provided with a pair of lengthwise extending recesses or slots 27 and 27' located diametrically opposite each other and which extend the full length of the shaft member which has a length corresponding substantially to that of the casing. In each of these recesses is located a wear-take-up member or shoe 28 and 28' provided with segmentally formed or crescent shaped wing extensions 29 which fit into recessed or rabbeted portions 30 at the ends of the shaft member. The outer face of each shoe and its wings is curved to form a cam face surface, thereby to insure a tight frictional engagement with the inner wall of the casing. Each of these shoes is likewise provided with an opening 31 therethrough for relieving the pressure of the oil which may penetrate into the shoe recesses, and also with suitable springs 32 for maintaining the cam faced portions of the shoes in tight frictional engagement with the inner wall of the casing thereby not only to make a frictionally tight fit, but automatically to take up the wear of the rotating parts. The outer sides of the wings are flush with the ends of the shaft member, while these wings and their connecting shoe portions project somewhat beyond the cylindrical face of the shaft member, having greater projection beyond the cylindrical face of the shaft member at the inner ends of the wings than at their outer ends, which latter ends are normally below the periphery of the cylinder. The oil passages hereinbefore referred to extending through the shaft member, open adjacent to each side of the shoe.

In one form of shoe shown, see Fig. 10, each shoe is dovetailed midway of its length, as at 40, a suitable spring being provided, as at 41, whereby the telescoped shoe portions may shift endwise relatively to each other to take up wear. A similar construction may be given the propellers, see Fig. 11, in which each propeller is dovetailed as at 42, a suitable spring 43 being provided for the purpose of permitting the parts of the propeller to shift endwise relatively to each other. Thus any wear on the ends of the shoes or on the ends of the propellers will be readily taken up by reason of the two-part formation of the shoes and propellers in a manner which will be readily understood.

In the operation of this improved rotary engine or driving means, the oil will be drawn by means of the pump from the source of supply or tank and forced, under the desired pressure, through for instance the pipes 6, 10, 12 and 12', to one set of ports or passages at the same side of each shoe, the pressure of which oil will then be exerted against the nearest two propellers. The passage of the oil in the opposite direction is prevented by the projecting shoes, so that the casing is caused to rotate and when each propeller reaches a shoe it will be, by means of its eccentric location and cam form thereof, retracted and permitted to pass thereover in a manner which will be readily understood. The pressure of the oil operating successively against a pair of propellers in the manner just described, thus continuously rotates the casing at the desired speed.

When it is desired to stop the rotation of the casing, it is necessary only to shift the valve into a neutral position, at which time the oil in the casing will be exhausted through the by-pass. If it is desired to reverse the engine, it is necessary merely to rotate the valve so as to connect the pipes 6 and 9 with the engine, whereby the operation just described will take place, except that the casing will be rotated in the reverse direction.

It will be understood that the oil passing through one set of passages at each side of a shoe to operate the propellers, will in due course pass out through the other set of passages at the opposite side of the shoe and back through, for instance, pipes 11, 9 and 8 to the tank so that the same oil may be used over and over again. In other words, pipes 10 and 12 are at one time the inlet passages while pipes 9 and 11 form the oil return conduits while the casing is rotating in one direction, while when the casing is rotating in the opposite direction pipes 9 and 11 become the inlet passages and pipes 10 and 12 the return passages for the oil.

From the foregoing it will be observed that I have provided a very inexpensive, compact and comparatively simple rotary engine or driving means, the successful operation of which is due not only to the manner in which the parts are constructed and assembled, but also to the openings through the propellers and the wear-take-up member; for without these to relieve the pressure and suction, the efficient operation of the engine would be practically impossible, since the cam-faced wear-take-up members or shoes could not raise or shift the propellers against the action of their springs, as the oil passing to the rear of these propellers would hold them out against the stationary shaft member and consequently the propellers could not pass over the eccentrically located shoes of such shaft member, but by means of these openings the pressure which occurs back of the propellers is relieved.

It will be noted that the stationary shaft and the shoe carrying enlarged part thereof is, as aforesaid, concentrically formed and that the shoes are separable therefrom and provide suitable eccentricity to form the necessary tight fit between the rotary casing and this part of the shaft. By this construction the parts are very much simplified and the cost materially reduced, since the only parts upon which wear comes are the small shiftable shoes extending the full length of the enlarged part of the shaft and which can easily be replaced, whereas if this entire part of the shaft were made of eccentric form it would have to be replaced at considerable expense.

Furthermore, it will be observed that the projecting parts of the shoes adjacent the ports where they open into the casing, insure the proper flow of oil under pressure to the propellers and that the tapered ends of the wings or crescent formed portions of the shoes are somewhat below the periphery of the shaft enlargement so as to prevent the propellers from catching these overhanging tapering ends as they ride over the faces of the shoes and of the wings thereof, which wings thus form tracks for the propellers.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a rotary engine, the combination of a casing and a shaft member, one shiftable relatively to the other, said shaft member comprising a shaft having an enlarged concentrically formed portion, one of said members having a plurality of resiliently controlled shiftable members and one of said members having a plurality of resiliently controlled eccentrically located shiftable shoes, each of said propellers and each of said shoes having an opening therethrough for relieving the pressure in the rear thereof, each of said shoes comprising a pair of connected, spaced segmentally formed wings, and said enlarged portion having rabbeted ends for the reception of said wings.

2. In a rotary engine, the combination of a casing and a shaft member, one shiftable relatively to the other, said shaft member comprising a shaft having an enlarged concentrically formed portion, one of said members having a plurality of resiliently controlled shiftable members and one of said members having a plurality of resiliently controlled eccentrically located shiftable shoes, each of said propellers and each of said shoes having an opening therethrough for relieving the pressure in the rear thereof, each of said shoes comprising a pair of connected, spaced segmentally formed wings, and said enlarged portion having rabbeted ends for the reception of said wings, the tapered ends of said wings being located within the periphery of the enlarged portion of the shaft.

3. In a rotary engine, the combination of a shaft, a rotary casing mounted on said shaft and having a fluid tight connection with a part thereof, said part having radially located fluid passages, a plurality of resiliently controlled shiftable propellers carried by said casing, and a plurality of shiftable resiliently controlled shoes carried by the shaft within the casing, each of said propellers and shoes having means to relieve the pressure at the rear thereof, and each of said shoes comprising a pair of connected spaced segmentally formed wings, that part of the shaft within the casing having rabbeted ends for the reception of said wings.

4. In a rotary engine, the combination of a shaft, a rotary casing mounted on said shaft and having a fluid tight connection with a part thereof, said part having radially located fluid passages, a plurality of resiliently controlled shiftable propellers carried by said casing, and a plurality of shiftable resiliently controlled shoes carried by the shaft within the casing, each of said propellers and shoes having means to relieve the pressure at the rear thereof, and each of said shoes comprising a pair of connected, spaced segmentally formed wings, that part of the shaft within the casing having rabbeted ends for the reception of said wings, each of said propellers having a resilient connection intermediate its ends.

5. In a rotary engine, the combination of a shaft, a rotary casing mounted on said shaft and having a fluidtight connection with a part thereof, said part having radially located fluid passages, a plurality of resiliently controlled shiftable propellers carried by said casing, and a plurality of shiftable resiliently controlled shoes carried by the shaft within the casing, each of said propellers and shoes having means to relieve the pressure at the rear thereof, and each of said shoes comprising a pair of connected, spaced segmentally formed wings, that part of the shaft within the casing having rabbeted ends for the reception of said wings, each of said shoes having a resilient connection intermediate its ends.

6. In a rotary engine, the combination of a shaft, a rotary casing mounted on said shaft and having a fluid tight connection with a part thereof, said part having radially located fluid passages, a plurality of resiliently controlled shiftable propellers carried by said casing, and a plurality of shiftable resiliently controlled shoes carried by the shaft within the casing, each of said propellers and shoes having means to relieve the pressure at the rear thereof, and each of said shoes comprising a pair of connected, spaced segmentally formed wings, that part of the shaft within the casing having rabbeted ends for the reception of said wings, each of said propellers and each of said shoes having a resilient connection intermediate its ends.

Signed at Binghamton, New York, this 5th day of January, 1927.

LUTHER W. SPRINGSTEEN.